United States Patent [19]

Lamaster

[11] Patent Number: 4,467,261
[45] Date of Patent: Aug. 21, 1984

[54] VARIABLE SPEED MOTOR DRIVE SYSTEM

[75] Inventor: Donald M. Lamaster, Costa Mesa, Calif.

[73] Assignee: Emerson Electric Co., St. Louis, Mo.

[21] Appl. No.: 397,031

[22] Filed: Jul. 12, 1982

[51] Int. Cl.³ .............................................. H02P 5/36
[52] U.S. Cl. .................................... 318/810; 363/132; 363/37
[58] Field of Search .................... 363/36, 37; 318/807–811, 801–803; 363/132, 134, 131, 133; 307/300, 253, 254, 315

[56] References Cited

U.S. PATENT DOCUMENTS

| | | | |
|---|---|---|---|
| 3,449,595 | 6/1969 | Marek | 307/254 |
| 4,338,532 | 7/1982 | Houghton | 307/300 X |
| 4,354,223 | 10/1982 | Turnbull | 318/811 X |
| 4,357,655 | 11/1982 | Beck | 318/811 |

Primary Examiner—G. Z. Rubinson
Assistant Examiner—Patrick Keane
Attorney, Agent, or Firm—Lyon & Lyon

[57] ABSTRACT

A motor drive system which utilizes the relatively poor storage time or turn-off time of Darlington pair power transistors which have typically been used as the driver elements in inverter motor driver applications. It primarily finds use in multiphase systems, such as the six step three phase inverter. The relatively long turn-off time of the power Darlington provides relatively constant collector current to the motor without the need for additional circuitry to provide constant base drive load. An additional circuit automatically and dynamically tailors the motor torque to the load requirements to minimize unnecessary use of electrial energy.

5 Claims, 12 Drawing Figures

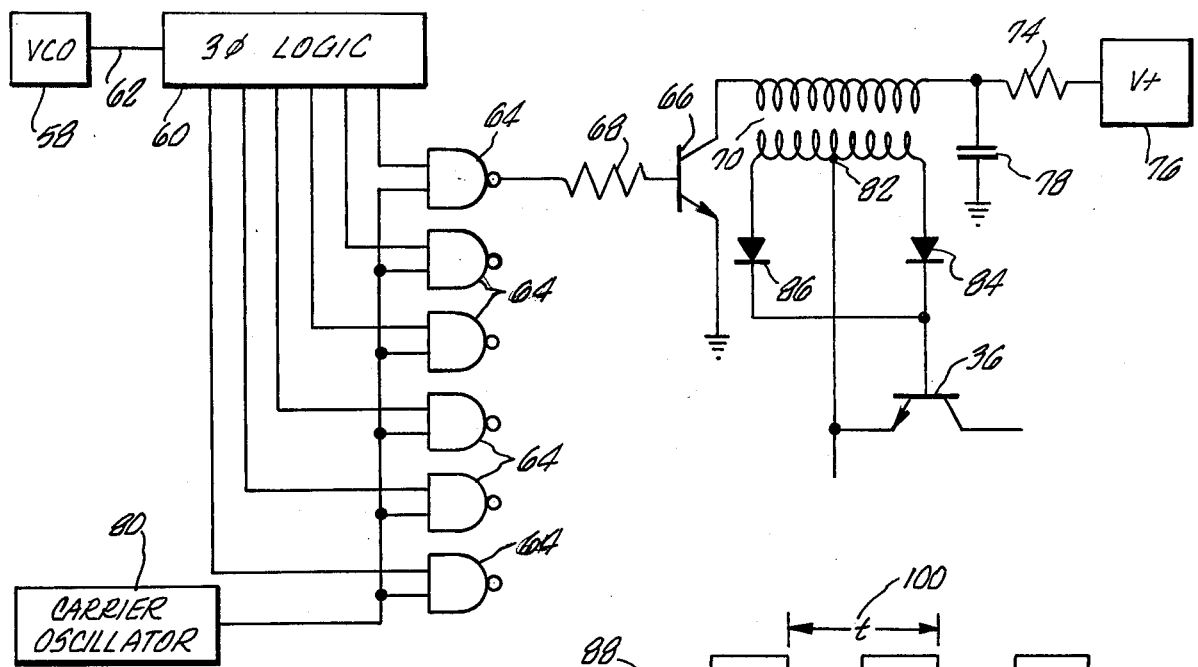
FIG. 2a.
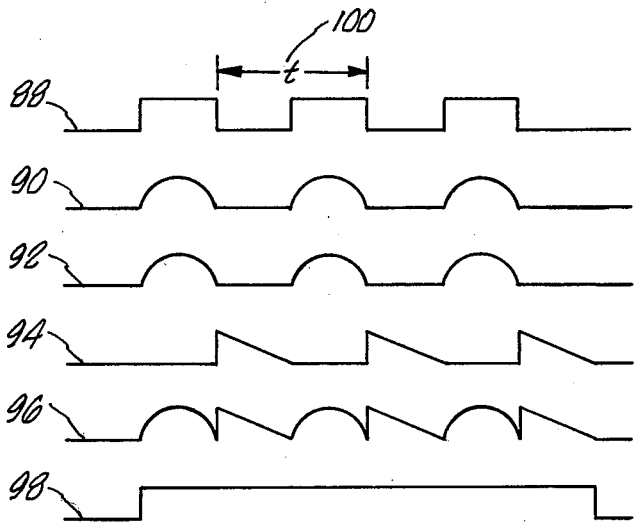
FIG. 2b.
FIG. 2c.
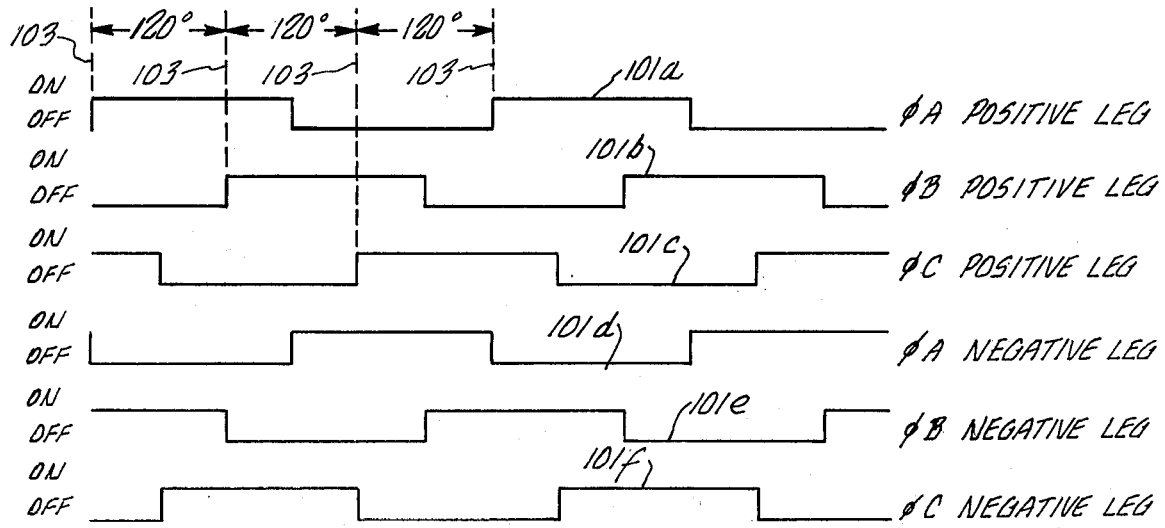

VARIABLE SPEED MOTOR DRIVE SYSTEM

BACKGROUND OF THE INVENTION

The synchronous speed of A.C. motors is proportional to the frequency of the applied power. The use of an adjustable frequency power supply to control the speed of A.C. motors is well-known. Such power supplies typically include a rectifier to convert the normal 60 Hz. alternating current (A.C.) power to direct current (D.C.), an inverter to convert the D.C. to A.C. at the desired frequency, and control circuitry to provide the signals necessary to synthesize the correct frequency to achieve a given desired motor speed.

In order to assure that a constant flux density is maintained throughout the range over which the frequency is to vary to achieve the desired speed control, the voltage applied to the motor should bear a relationship to the frequency. Typical motor speed control configurations are designed to maintain a constant value of volts per hertz; i.e., the quantity $V_t/f$ where $V_t$ is the terminal voltage applied to the motor and f is the frequency of the applied A.C. power.

In order to maintain this constant $V_t/f$, A.C. motor speed control systems often employ a chopper circuit in between the rectifier and the inverter to deliver variable voltage D.C. power to the inverter to compensate for changes in frequency.

Typical motor speed control inverters have used thyristors and transistors as switching elements. In order to supply signals to turn on these devices it has been necessary to use isolation devices, such as optical couplers or transformers, and one or more separate power supplies for the gate or base drive circuits of the switching elements. These schemes have proved to be adequate for the task, but there has remained a need to accomplish inverter switching with a minimum number of components to minimize the system cost, while at the same time maintaining reliability and minimum drive requirements.

Some variable frequency A.C. motor speed control schemes are implemented for energy savings. Industrial applications of A.C. motors represent a major use of electrical energy. As the cost of energy increases, the industry, recognizing that there is a potential for energy savings in motor applications where motor loads vary, such as fan or pump loads, has begun to realize energy saving by varying the speed of motors where possible. This energy saving results directly in cost savings.

There are, however, situations where a motor is capable of supplying more torque than is required by the load at a given speed. This additional torque represents wasted energy since it is not necessary to drive the load. There thus exists a need for a means to tailor the motor torque to the load requirements in order to realize the maximum energy savings possible.

It is an object of this invention to provide an improved base drive circuit for the drive transistors in an A.C. motor speed control inverter.

It is a further object of this invention to provide a reliable base drive circuit for A.C. motor speed control inverters which utilizes a minimum number of low-cost components.

Another object of this invention is to provide an A.C. motor speed control system which dynamically tailors the torque delivered by the motor to the load requirements.

Yet another object of the invention is to provide an A.C. motor speed control system which minimizes unnecessary use of electrical energy to drive the motor.

SUMMARY OF THE INVENTION

The present invention utilizes the relatively poor storage time or turn-off time of darlington pair power transistors which have typically been used as the driver elements in inverter motor driver applications. It primarily finds use in multiphase systems, such as the well known six step three phase inverter used to drive industrial duty three phase motors although those skilled in the art, with the aid of the disclosure herein, will recognize its adaptability to other applications.

This invention has capitalized on this parameter, which has heretofore been regarded as a drawback in the use of these power darlington switching devices. A circuit configuration has been devised which takes advantage of the relatively long turn-off time of the power darlington to provide relatively constant collector current to the motor without the need for additional circuitry to provide constant base drive load. This configuration also allows for the use of a relatively inexpensive pulse transformer as the isolation element and eliminates the need for separate base drive power supplies widely employed in prior art systems.

An additional circuit monitors the negative current in the inverter and uses that current to adjust the voltage applied to the motor to force the motor to operate at a power factor (P.F.) of at least 0.5 lagging. This adjustment automatically and dynamically tailors the motor torque to the load requirements to minimize unnecessary use of electrical energy.

BRIEF DESCRIPTION OF THE DRAWINGS

FIG. 2a is a schematic diagram of an individual driver circuit according to the invention.

FIG. 2b shows the waveforms produced by the circuit of FIG. 2a.

FIG. 2c shows the timing relationship for the sequencing of the driver circuits.

FIG. 3b shows the waveforms produced by the circuit of FIG. 3a.

DETAILED DESCRIPTION OF THE INVENTION

Figure 1:
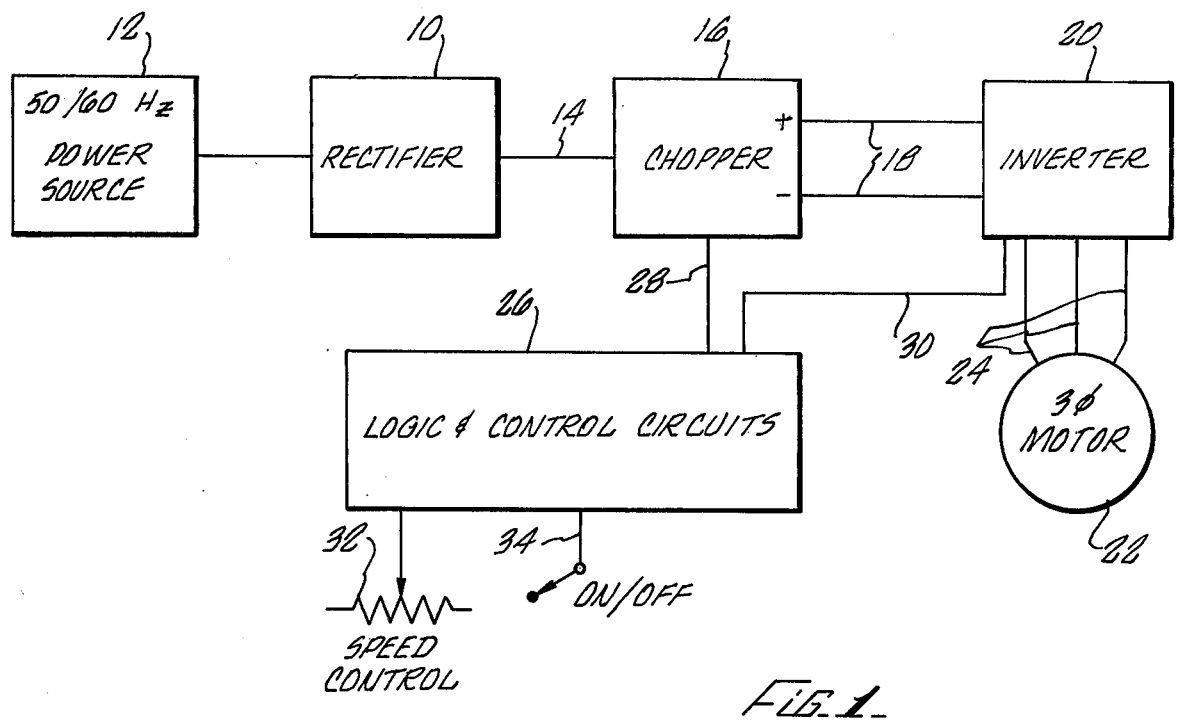
FIG. 1a is a block diagram of an A.C. motor speed control system utilizing the present invention.
FIG. 1b is a schematic diagram of the inverter portion of an A.C. motor speed control system showing the relationship of the unique driver circuits to the driver transistors.

Referring first to FIG. 1a, a block diagram of an A.C. motor speed control system of the present invention comprises a rectifier 10, supplied from a source of 60 Hz A.C. electrical energy 12. The D.C. output of rectifier 10 is supplied via line 14 to chopper 16. The D.C. output of chopper 16, at the correct voltage to assure proper motor operation at the speed determined by the frequency of the applied power, is supplied via positive and negative lines 18 to inverter 20, which converts the D.C. voltage to an A.C. voltage at the frequency required to set the desired motor speed. The inverter output is supplied to three phase motor 22 via lines 24.

Logic and control circuits block 26 provides signals to the chopper 16 and inverter 20 via lines 28 and 30 respectively. These signals are used to control the output voltage of the chopper and the output frequency of the inverter. Logic block 26 responds to controls 32 for adjusting the motor speed and on/off control 34 for starting and stopping the motor 22.

Referring to FIG. 1b, three phase six stage inverter 20 is seen to comprise darlington power transistors 36, 38, 40, 42, 44 and 46. Motorola MJ 10000 Series Power Darlingtons, or equivalents, have been found to function satisfactorily for this purpose. The collector emitter terminals of these transistors are bridged by feedback diodes 48. The transistor diode combinations are arranged in pairs, i.e., transistor 36 and 38 for phase A, 40 and 42, for phase B and 44 and 46 for phase C, each pair connected to the positive and negative D.C. buses and three phase motor 22 as shown and as known in the art. Power is supplied to motor 22 via lines 50, 52 and 54, connected to the emitter collector nodes of transistor phase driver pairs 36 and 38, 40 and 42, and 44 and 46, respectively, as is also known in the art. The base of each of the transistors 36, 38, 40, 42, 44 and 46 is driven individually by a base driver circuit 56.

Figure 2:
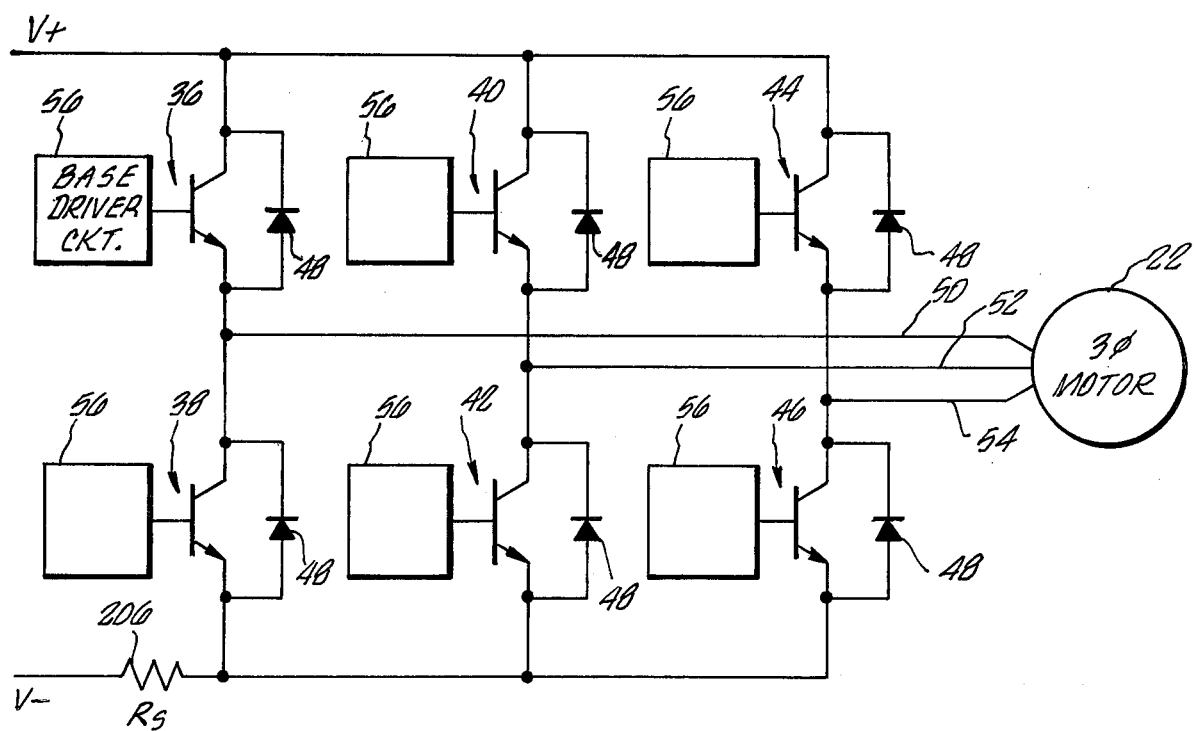

The operation of the base driver circuits 56 can best be seen with reference to FIG. 2a. The heart of the base driver circuits is variable frequency voltage controlled oscillator (VCO) 58, which determines the basic motor speed. VCO 58 supplies a pulse train to three phase logic 60 via line 62. Three phase logic 60 uses this pulse train to derive a set of control signals to drive the three phase six step voltage source inverter shown in FIG. 1b with the right sequence to operate the three phase motor 22. This sequence, typical in the industry, is illustrated in FIG. 2c.

Each individual base driver circuit 56 is composed of gate 64, which drives the base of transistor 66 through base resistor 68. Transistor 66 is configured as a common emitter circuit and its collector is connected through one winding of pulse transformer 70 and resistor 74, to a source of D.C. voltage 76. Resistor 74 acts as a current limiter and capacitor 78 decouples the high frequency from the power supply and acts to shape the collector circuit waveform to provide more even induced current in the secondary of transformer 70.

Gate 64 is driven by the output of three phase logic 60, already described, and carrier oscillator 80. The carrier oscillator 80 provides a signal which is presented to the base of transistor 66 through resistor 68 from gate 64 only when three phase logic 60 has enabled the other input of gate 64. As is evident from FIG. 2a, VCO 58, three phase logic 60, and carrier oscillator 80 are shared by all driver circuits.

The frequency at which carrier oscillator 80 operates is chosen in conjunction with the storage or turn-off time of power darlington transistor 36 which is to be switched by driver circuit 56. That is, the carrier period is chosen such that the storage or turn-off time of the power darlington transistors is larger than the carrier oscillator period. A carrier frequency in the neighborhood of 150 KHz has been found to be satisfactory when Motorola MJ 10000 series Darlington transistors are used.

When gate 64 is enabled, the pulse train output from carrier oscillator 80 appears at the base of transistor 66 via resistor 68. Transistor 66 may be any high speed switching transistor, such as a 2N4401 or equivalent. The pulse train is a voltage which may vary between two voltage levels whose magnitudes depends on the logic family, e.g., TTL, used to implement gate 64.

When the voltage at the base of transistor 66 becomes positive, the transistor turns on and conducts current the winding of transformer 70 in its collector circuit. This current produces a pulse at the secondary winding of transformer 70 via inductive coupling. This pulse drives the base emitter junction of driver transistor 36 through the loop comprising diode 84 and the center tap 82 of transformer 70. Diode 86 is reverse-biased at this moment and does not conduct. Transistor 36 is thus turned on, and provides current flow to the motor load.

When the voltage at the base of transistor 66 returns to zero, the field in transformer 70 collapses, and the energy stored therein produces a current flow in transformer 70 opposite in polarity to the current flow produced when transistor 66 was turned on. This current produces a pulse at the secondary of transformer 70 which, through diode 86 (now forward based) drives the base of transistor 36, providing current flow to the motor load. Those skilled in the art will recognize that the center tapped winding of transformer 70 along with diodes 84 and 86 form a full wave center tapped rectifier circuit as is well known in the art.

The two events which supply base drive to driver transistor 36 are the energization and de-energization of the winding of transformer 70, which correspond to the rising and falling edges, respectively, of the pulse train output of gate 64, and hence the turn on and turn off of transistor 66. In order to provide a constant current drive through the collector emitter junction of driver transistor 36, the relatively slow storage or turn-off time of the power darlington transistor is utilized. The combination of the turn-off time of transistor 36 and the pulse repetition rate of carrier oscillator 80 act together to provide a relatively constant collector current through transistor 36 despite the fluctuations in base drive current.

This action may be illustrated by reference to FIG. 2b in conjunction with FIG. 2a. Square wave 88 is the gated portion of the output of carrier oscillator 80 appearing at the output of gate 64 when it is enabled. The rising edge of each pulse turns transistor 66 on, producing the current waveform 90 through the pulse transformer 70. The current through diode 84, developed in the center tapped winding of transformer 70 through the inductive coupling of the current 90 is shown as drive current component 92.

The falling edge of each pulse from the output of transistor 66 turns that transistor off, causing the field around the winding of pulse transformer 70 to collapse. This collapsing field induces a current 94, opposite in direction to current 90, in the center tapped winding of transformer 70. This current flows through diode 86, the base emitter junction of driver transistor 36, and back to the center tap 82 of the transformer winding. Because of the full wave rectifier action of the center tapped transformer winding and diodes 84 and 86, a full wave rectified waveform like 96 occurs, the base of driver transistor 36 is driven positively during both the rising and falling edges of pulse train 88.

It can be seen that if the time interval t, shown at 100, between the falling edges of pulse train 88 is shorter than the storage or turn-off time of transistor 36, the load current through transistor 36 will be relatively constant, as illustrated at 98, thus providing a stable drive to motor 22.

The output of three phase logic circuit 60 of FIG. 2a is the conventional signal sequence used to drive six step three phase inverters, and is illustrated in FIG. 2c, where the positive enabling signals for phases A, B and C and the negative enabling signals for phases A, B and C are depicted at reference numerals 101a through 101f respectively. The 120° phase difference between the enabling signals is illustrated by dashed lines 103.

Figure 3A:
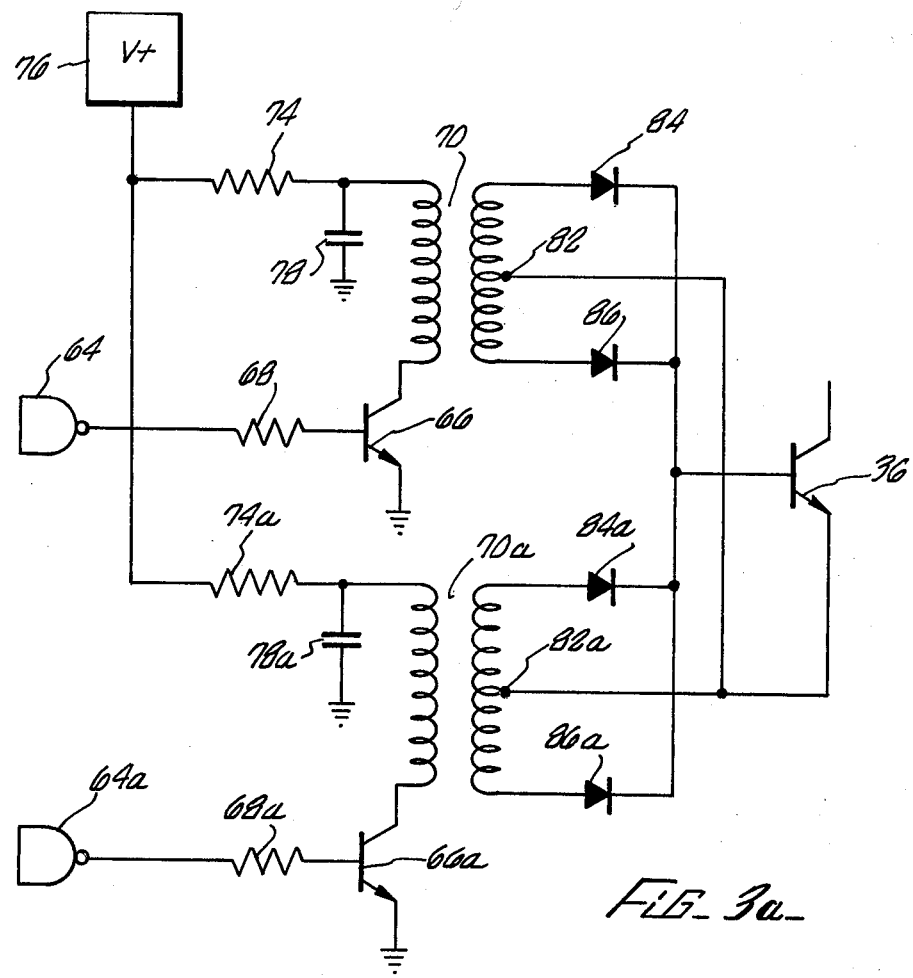
FIG. 3a is a schematic diagram of an alternate embodiment of the individual driver circuit of the invention.

FIG. 3a shows an alternative embodiment of the base driver circuit depicted in FIG. 2a. It is essentially a composite of two circuits of FIG. 2a. The top portion of FIG. 3a has been numbered identically to FIG. 2a and the bottom portion carries the same numbers followed by the letter "a" to facilitate a comparison.

Figure 3B:
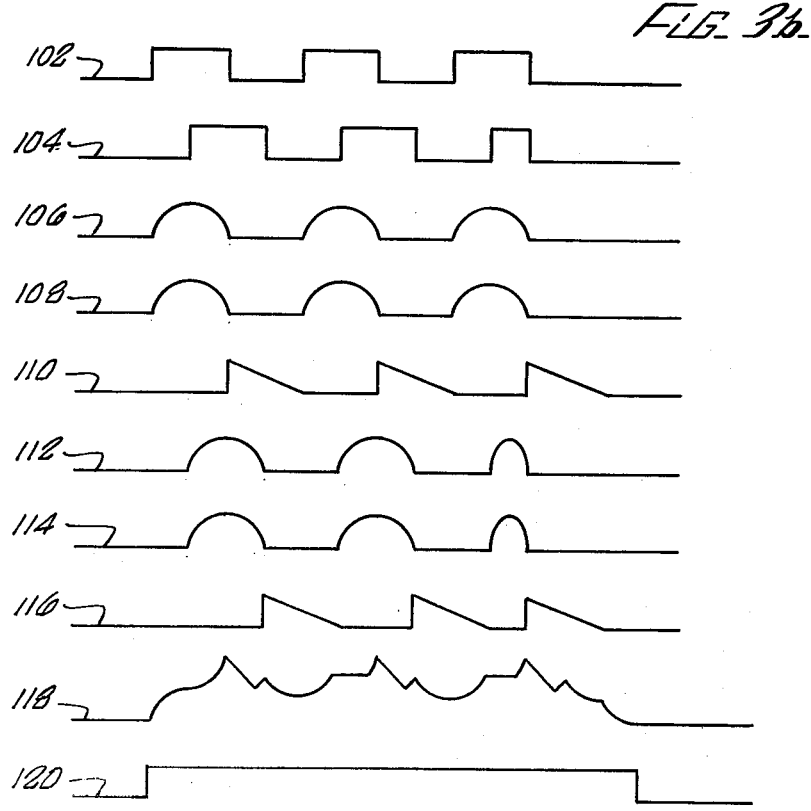

The commonly connected cathodes of diodes 84a and 86a are connected to the cathodes of diodes 84 and 86 and to the base of transistor 36. The input to base resistor 68a of transistor 66a is, like that of its counterparts, fed by the output of a gate 64a. That gate, 64a, is, however, driven by a pulse train which is 90 degrees lagging from that used to drive gate 64 from the output of carrier oscillator 80. FIG. 3b illustrates the relationship between the drive signals for gates 64 and 64a at 102 and 104 respectively. Thus, this embodiment requires that carrier oscillator 80 put out two signals identical in profile but 90 degrees out of phase with one another. Numerals 106, 108, and 110 of FIG. 3b correspond to numerals 90, 92, and 94 of FIG. 2b. Numerals 112, 114, and 116 of FIG. 3b correspond to 100, 108, and 110 only they have been phase shifted 90°.

As illustrated by FIG. 3b, the circuit of FIG. 3a provides a greater base drive current 118 to the base of transistor 36 than does the circuit of FIG. 2a, since the average current is higher. Further, since the current peaks are closer together, as illustrated at 118 the circuit of FIG. 3a may use a darlington pair driver transistor 36 with a faster storage or turn-off time than could be used in the circuit of FIG. 2a. Since there are twice as many current drive events (rising and falling edges of base drive signals to transistors 66 and 66a) in the circuit of FIG. 3a, there exists a smoother composite drive waveform in the circuit as seen in FIG. 3b.

Figure 4:
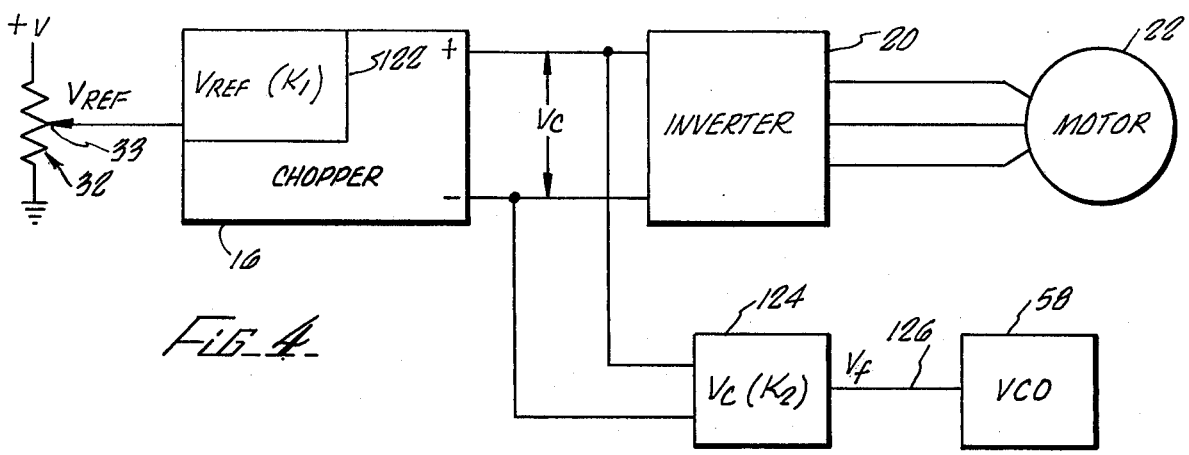
FIG. 4 is a block diagram of the voltage and frequency control circuit portion of an A.C. motor speed control system according to the invention.

The manner of frequency selection for VCO 58, which determines motor speed, and the manner in which the output voltage of the chopper is determined and controlled, can be seen with reference to FIG. 4.

Speed reference potentiometer 32 is user-set to select a desired speed for motor 22. The voltage $V_{ref}$, appearing at wiper 33 of potentiometer 32, is multiplied by a constant in amplifier 122, which is a part of chopper 16. This voltage is used, as is known in the art, to control the voltage across the output of chopper 16, which assumes a value Vc and is presented to inverter 20.

The output voltage Vc of chopper 16 is sensed and multiplied by a constant in amplifier 124. A VCO control voltage Vf appears at the output of amplifier 124 and is presented to VCO 58 via line 126. This voltage sets the frequency of VCO 58, used to drive the inverter 20.

Thus it can be seen that varying potentiometer 32 causes change in both the chopper output voltage Vc, (essentially the voltage presented to the motor 22 via inverter 20) and the frequency at which the inverter is switched. This results in a relatively constant $V_t/f$ or volts per hertz to the motor 22 and assures that the motor operates at a relatively constant flux density over its entire speed range.

Figure 5:
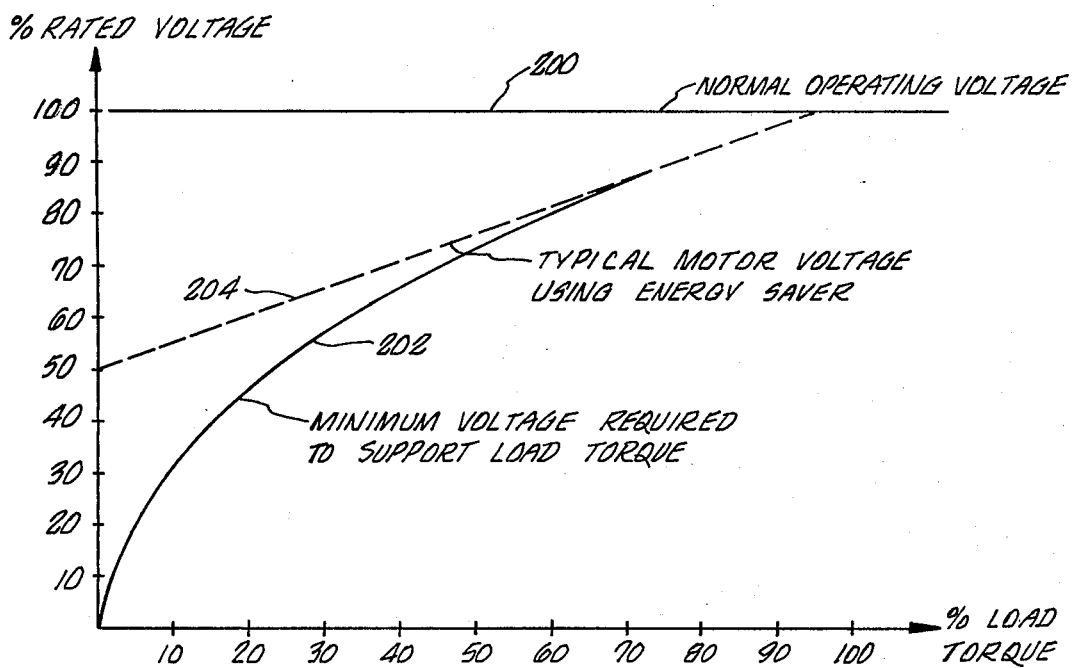
FIG. 5 is a graph illustrating the actual versus required voltage for a motor operating under varying load conditions.

In some motor applications the motor is capable of supplying more torque than is required by the load. This is shown in FIG. 5, a graph in which line 200 represents the normal operating motor voltage and line 202 represents the motor voltage required to support the load. It can be seen that the motor voltage can be reduced below its normal operating point and still be sufficient to support the load torque. Thus the area between lines 200 and 204 represent potential energy savings obtainable without degration in motor performance.

Figure 6:
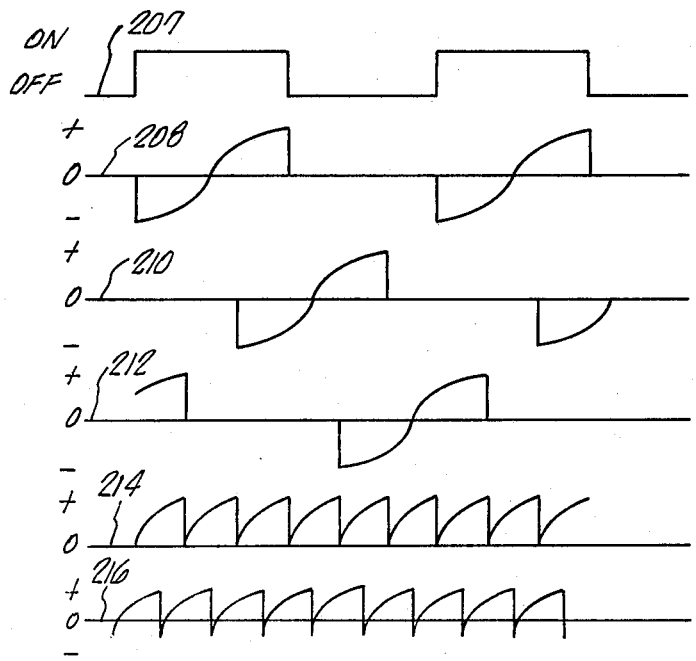
FIG. 6 is a representation of the current waveforms produced by a motor utilizing the present invention showing power factor maximization.

In a motor equipped with a speed control system like that of FIG. 1b, the currents through the negative leg of the inverter 20 to the motor 22 via transistors 38, 42 and 46 are shown in FIG. 6 at 208, 210 and 212 respectively. For simplicity of illustration, the load current is assumed to be a sinewave and the motor is operating at a power factor (P.F.) of 0.5 lagging. Those skilled in the art will recognize that an inverter employing thyristors or other switching elements is adaptable to the present invention. The negative bus line of the inverter in FIG. 1b is provided with a current sensing resistor $R_s$, shown at 206. The current waveform $I_{Rs}$, for the condition of P.F.=0.5 lagging is shown at 214 of FIG. 6. It is to be noted that this current is unipolar and does not change direction for any part of the cycle. The phase-related enabling signal for gating the pulse train which drives the inverter transistor of the particular leg is depicted at 207.

At a P.F. of less than 0.5 lagging, the total negative bus current $I_{RS}$, the sum of the currents through the driver transistors which are in conduction and through motor 22, changes polarity during portions of the cycle. This is depicted at 216 on FIG. 6. By sensing the negative component of $I_{Rs}$ and forcing it to zero in a servo loop, the power factor of the motor may be maintained at no less than 0.5 lagging. This can be accomplished by reducing the excitation voltage of the motor by controlling the output Vc from the chopper, and results in a saving of energy.

Figure 7:
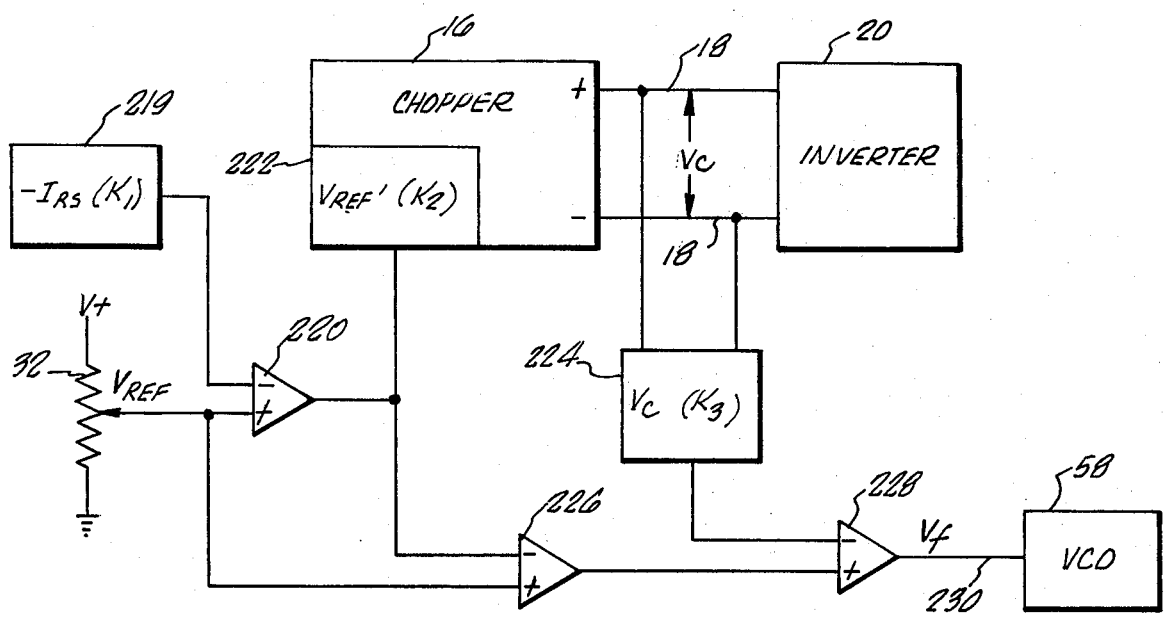
FIG. 7 is a block diagram of a circuit for increasing power factor by lowering motor voltage when appropriate.

The manner in which this may be accomplished by the present invention is shown with reference to FIG. 7, a modification of the circuitry of FIG. 4. $I_{RS}$ is sensed by resistor 206 ($R_s$), shown in FIG. 1b, which converts it to a voltage, represented by the box labelled $-I_{RS}(K_1)$, indicated at numeral 219 in FIG. 7. This voltage is summed with the voltage $V_{ref}$ from potentiometer 32 in summing amplifier 220. This modified voltage reference signal is multiplied by a constant in amplifier 222, similar to amplifier 122 of FIG. 4, and a part of the chopper circuit. It is this modified reference voltage which determines the chopper voltage output Vc and acts to lower motor voltage when a negative value of $I_{RS}$ is detected.

The chopper output voltage is sensed and multiplied by a constant in amplifier 224, similar to amplifier 124 in FIG. 4. The voltage output of amplifier 224 will differ from that of amplifier 124 of FIG. 4 because the correction to the chopper voltage made in summing amplifier 220 has altered the voltage values. In order to compensate for this change, summing amplifier 226 subtracts the modified voltage reference signal from $V_{ref}$ and adds the difference to the output of amplifier 224 as a correction factor in summing amplifier 228.

The output of summing amplifier 228 is a voltage $V_f$, appearing on line 230, which, as shown identically in FIG. 4, is used to control the frequency of VCO 58.

Thus, the circuit of FIG. 7 behaves exactly like that of FIG. 4, except that, in addition, it adjusts the chopper voltage output Vc to provide a lower field excitation for the motor when the power factor drops below 0.5, and compensates for that change to set the speed of motor 22 as if the adjustment had not been made. This combined action results in the same motor speed as if the circuit of FIG. 4 had been used, but at a lower field excitation. The energy savings achieved by this system are represented in FIG. 5 by the area between line 204, the motor voltage produced by the circuit of FIG. 7, and line 200, the motor voltage produced by the circuit of FIG. 4.

Figure 8:
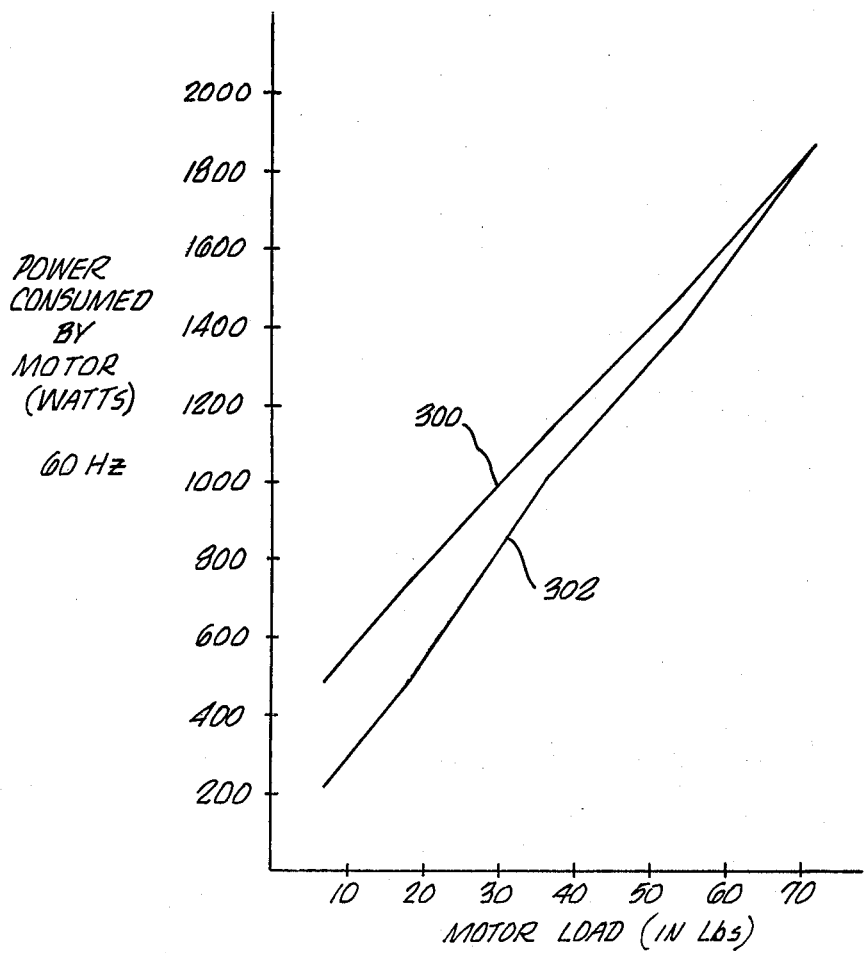
FIG. 8 is a graph illustrating the energy savings achieved using the present invention.

FIG. 8 is an additional graph showing the energy savings produced using a 2 Horsepower 1800 r.p.m. motor running at a P.F. of 0.48 at a torque of 35 inch pounds and 0.72 fit at 70 inch pounds) full load. The line at 300 represents operation of the motor without power factor correction and the line at 302 represents motor operation using this energy saving feature.

It should be noted that, in most motor speed control systems of the type herein described, the voltage and current supplied by the inverter is not sinusoidal in nature. Under these conditions, the negative leg current will have a negative component at a power factor of greater than 0.5 and those skilled in the art will recognize the availability of energy savings at power factors greater than 0.5.

Furthermore, those skilled in the art will appreciate that, although the present invention has been described with respect to three-phase systems, it is equally applicable to other polyphase systems as is apparent from this specification.

While preferred embodiments have been described it is to be understood that various modifications can be made by those skilled in the art and that it is the intent to cover such embodiments which fall within the scope of the appended claims.

I claim:

1. A method of controlling the speed of a polyphase alternating current motor driven by an inverter comprising the steps of:
   supplying current to the motor via transistors having relatively slow switching speeds;
   selectively driving the transistors from a carrier signal comprising a series of pulses, having a repetition rate faster than the switching speed of the transistors.

2. The method of claim 1 wherein the transistors are power darlingtons and the pulse repetition rate is 150 KH$_z$ or higher.

3. Apparatus for controlling the speed of a polyphase alternating current motor driven by an inverter comprising:
   transistor means for supplying current to each of the motor phases, said transistor means having a relatively slow switching speed;
   means for individually and selectively driving said transistor means from a carrier signal comprising a series of pulses with a repetition rate faster than the switching speed of said transistor means.

4. Apparatus for providing the base drive for transistors in a polyphase alternating current motor speed controller inverter comprising:
   a source of phase-related drive enable signals;
   a source of high-frequency pulses;
   gating means to selectively conduct said high-frequency pulses in response to said phase-related drive signals, the number of gating means being equal to the number of phase-related drive signals;
   individual receiving means for receiving said high-frequency pulses from the outputs of said gating means;
   transistor switching means, having a switching speed slower than the repetition rate of said high-frequency pulses, for passing load current to said motor in response to said high frequency pulses from each individual gating means, each of said transistor switching means being connected to the output of a single one of said gating means.

5. Apparatus for controlling the speed of a polyphase alternating current motor driven by an inverter, comprising:
   a source of phase-related drive signals;
   a source of high frequency pulses;
   gating means to selectively conduct said high frequency pulses in response to said phase-related drive signals, the number of gating means being equal to the number of phase related drive signals;
   high speed switching transistor means for receiving said high-frequency pulses from the outputs of each of said gating means;
   a plurality of pulse transformers having primary and secondary windings and connected via said primary windings to each of said high speed transistor switching means for coupling said pulses to said secondary windings;
   rectifier means connected to the secondary winding of each of said pulse transformers for converting the alternating current signals from said secondary windings to unipolar pulses;
   power darlington driver transistors connected to each of said rectifier means to receive said unipolar pulses, for supplying load current to said motor phases, said power darlington driver means having a switching speed slower than the repetition rate of said high-frequency pulses.

* * * * *